3,014,962
CARBONYLATION OF ALCOHOLS, ESTERS AND ETHERS WITH CARBON MONOXIDE
Walter Reppe, Heidelberg, Nikolaus von Kutepow, Karlsruhe-Rueppurr, and Heinz Bille, Ludwigshafen (Rhine), Germany, assignors to Badische Anilin- & Soda-Fabrik Aktiengesellschaft, Ludwigshafen (Rhine), Germany
No Drawing. Filed May 14, 1957, Ser. No. 659,180
Claims priority, application Germany Sept. 10, 1953
13 Claims. (Cl. 260—532)

The present invention relates to the production of organic oxygen compounds by the carbonylation of alcohols, esters and ethers with carbon monoxide under superatmospheric pressure and at elevated temperatures in the presence of carbonylation catalysts. In more specific terms, it relates to the use of carbonylation catalysts containing iron, cobalt or nickel, as an activator free halogen or halogen compounds and additional activating ingredients hereinafter more specifically disclosed.

It is a continuation-in-part of our application Ser. No. 448,762, filed August 9, 1954, now abandoned.

It has heretofore already been known that organic oxygen compounds may be prepared by treating under superatmospheric pressure and at elevated temperatures alcohols, esters or ethers with carbon monoxide in the presence of metals capable of forming metal carbonyls, in particular of metals of the iron group, or their compounds. It is also known that the presence of free halogen or halogen compounds has an activating effect on such carbonylation catalysts. The products obtained in such carbonylations are either carboxylic acids or their esters or anhydrides, wherein the carboxylic acid radical contains one carbon atom more than the starting material.

It is an object of the present invention to increase the activity of carbonylation catalysts as defined above to improve the carbonylation of alcohols, ethers and esters.

We have found, and that constitutes the basis of our invention, that the reaction between alcohols, esters or ethers with carbon monoxide which may be used in combination with minor amounts of hydrogen is substantially facilitated by the use of carbonylation catalysts activated by the presence of complex-forming polyfunctional organic compounds. These complex-forming organic compounds are distinguished by the fact that they contain at least 2 functional groups and are capable of binding metals of the iron group under the formation of complexes which contain the carbonyl-forming metal as central atom.

The catalysts according to our invention, therefore, contain as one ingredient a metal of the iron group, preferably in the form of a salt, such as the salts of lower fatty acids, e.g. acetic, propionic or butyric acid. It might be preferable to use the salt of the carboxylic acid which will be formed as such or in the form of its esters or anhydride in the carbonylation, but this is of no great importance because this salt will be formed anyway by double conversion. The second ingredient in our catalysts is a halogen which may be used either in the form of free halogen or in the form of a halogen compound. Iodine has proved most active as the halogen to be used. The activity of bromine is somewhat lower and that of chlorine lowest. Among the halogen compounds which may be used we cite as an example the free halogen hydrides or their salts or esters, e.g. hydrogen iodide, alkali metal iodides, and the alkyl iodides derived from lower fatty alcohols containing up to 4 carbon atoms, e.g. methyl or ethyl iodide. The carbonyl-forming metal of the iron group and the halogen may also be used in combination, for example in the form of cobalt iodide.

The third ingredient of the catalysts according to our invention is an organic polyfunctional compound which is capable of forming complex compounds with metals of the iron group, wherein these metals form the central atom. We have found that suitable polyfunctional compounds should contain at least two representatives of the following groups: Hydroxy, carboxylic acid, nitrile, keto and amino groups. In order not to interfere with the carbonylation, these compounds should be nonolefinic, i.e. derived from the paraffin, cycloparaffin, aromatic or paraffinoaromatic series.

In these polyfunctional compounds the functional groups may be present in the following combination:

$H_2N-$ ... $-OH$. Examples of such compounds are the amino phenols, like ortho-, para- and meta-amino phenol and the alkyl substitution products of such phenols, containing hydrocarbon radicals with up to 4 carbon atoms, e.g. o-amino-p-cresol. We may also use amino alcohols, such as mono-, di- or triethanol amine. We may also use alkylol amines, derived from mono- and dialkyl amines containing paraffinic hydrocarbon radicals with up to 8 carbon atoms, such as monoethanol diethylamine, monoethanol octyl amine or diethanol butyl amine.

$H_2N-$ ... $-COOH$. These amino carboxylic acids may be derived from the aliphatic or aromatic series. Among the aliphatic amino carboxylic acids we refer to glycocoll, alanine, amino butyric acid and the lactams, derived from such acids, such as butyrolactam or caprolactam. Among the aromatic amino carboxylic acids we refer to anthranilic acid and its homologues, containing hydrocarbon radicals with up to 4 carbon atoms.

$HO-$ ... $-COOH$. Among the hydroxy carboxylic acids we may use those of the aliphatic series, like lactic acid, tartaric acid, citric acid and their homologues, as well as hydroaromatic dicarboxylic acids, such as hexahydro orthophthalic acid. Among the aromatic acids usable for our invention we refer to salicylic acid and methyl salicylic acid. Though these polyfunctional additives contain hydroxy groups and might, therefore, be liable to be carbonylated, such carbonylation has not been observed. Without committing ourselves to a definite explanation, we assume that the hydroxy groups are made inactive to carbonylation by the complex bond to the metal of iron group.

Ketocarboxylic acids have been found very useful for the practice of our invention. We cite as examples alpha-ketopropionic acid and propionyl propionic acid.

Among the diketones which may be used for our invention we refer to acetyl acetone.

$HO-$ ... $-OH$. As examples of this type of polyfunctional compounds we cite ortho-, meta- and para-dihydroxy benzene and the homologues of these compounds, containing aliphatic hydrocarbon radicals with up to 4 carbon atoms.

$NC\equiv C-$ ... $-C\equiv N$. We have found dinitriles of the aliphatic series, containing from 1 to 4 carbon atoms between the nitrile groups as particularly useful. Examples of these compounds are malodinitrile and adipic acid dinitrile.

H₂N . . . —NH₂. As examples of these diamino compounds we cite hydrazine ethylene diamine and hexamethylene diamine as well as the homologues, containing between 3 and 5 carbon atoms in the chain.

It is selfunderstood that we may use compounds, containing more than 2 functional groups, such as amino hydroxy carboxylic acids or hydroxy ketocarboxylic acids. In addition to these polyfunctional compounds we may also use other compounds which are already known as activators for carbonylation catalysts of the iron group, such as carbonyls of the metals of the iron group or tertiary amines, like pyridine.

While one may assume that the above identified three ingredients in our catalysts actually form a complex compound, containing these three ingredients under the reaction conditions, it is neither necessary nor advantageous to start the reaction with a ready-made complex compound. We prefer to add to the starting material, e.g. methanol, a metal salt, such as cobalt acetate or propionate, a halogen, such as iodine, and a polyfunctional compound of the type referred to above. Since we assume that under reaction conditions these compounds form a complex, it is preferred to use these ingredients in such a ratio that for 1 atom of the carbonylforming metal about 2 or 3 molecules of the polyfunctional compound are present. Under these conditions a complex compound with the metal of the iron group as the central atom may be formed.

One reason for the theory that true complex compounds are formed during the reaction is the fact that the mixtures of the ingredients are distinguished by very intensive color from the individual components. However, it is very difficult to isolate such complex compounds on account of their instability. However, they appear to be more or less stable in solution. On the other hand, it is to be assumed that the well-defined complex compounds which together with halogen form the catalysts according to our invention act not as such but also in the form of products, wherein one or more of the bonds of the central atom are substituted or filled up by Co-radicals.

Whether the catalysts according to our invention act as true complex compounds or whether they are converted to some extent during the reaction is of no principal consequence for the performance of these catalysts. It is also possible to use these catalysts repeatedly. We have found that after having distilled off the reaction products and unchanged starting materials from the reaction mixture, the distillation residue may be used without purification as such for a new batch with the same efficiency as a fresh catalyst.

The catalysts according to our invention may be used, for example, in the synthesis of carboxylic acids and esters from alcohols, of carboxylic acid anhydrides from esters and of carboxylic esters and anhydrides from ethers. The reaction conditions for the carbonylation with the catalysts according to our invention correspond in principle to the hitherto used carbonylation conditions. The temperature is preferably between 180° and 350° C., in particular between 200° and 250° C. The reaction is carried out under a pressure exceeding 50 atmospheres, in particuar at pressures between 100 and 900 atmospheres. However, if the necessary equipment is available pressures exceeding 900 atmospheres may be used.

The carbon monoxide used for the carbonylation according to our invention may contain hydrogen. The amount of hydrogen should not exceed that of carbon monoxide, we prefer to keep the ratio by volume between CO and H₂ at least at 70 to 30.

The carbonylation in the presence of the catalysts according to our invention may be carried out batchwise or continuously. The new catalysts are most suitable for continuous operation, since they may be dissolved in the starting materials and be recovered from the reaction mixture and returned to the reaction zone. We may also use in addition to the starting material an inert solvent in carrying out the process according to our invention. For example the reaction products themselves or aromatic, alicyclic, aliphatic hydrocarbons or their halogen derivatives may be used. We may work in the absence of water, but we have found the addition of a small amount of water is sometimes helpful, since in amounts of 5 percent or more, say up to 30 percent, calculated on the starting material, the presence of water will, for example, decrease the formation of methyl acetate when starting from methanol and carbon monoxide to produce acetic acid.

It is not necessary to carry out the carbonylation reaction in the presence of the new catalysts to such an extent that the starting material is completely changed. It is quite possible to convert only a substantial amount of the starting material and use the non-converted starting material recovered from the reaction mixture again for another carbonylation. When working continuously we may lead the starting material through a vertical reactor upwards and the carbon monoxide either in direct current or counter-current while using the CO as a circulating gas. When working in direct current the alcohol and the catalyst dissolved therein as well as the carbon monoxide or carbon monoxide-containing gas are admitted at the lower end of the reaction vessel and the reaction mixture taken off at the upper end thereof. When working in counter-current the starting material, containing the dissolved catalyst, is introduced at the upper end, while the carbon monoxide is pressed in at the lower end of the reaction vessel and the reaction mixture is withdrawn at the lower end through a syphon.

The catalysts according to our invention have been found most active for the carbonylation of methanol and the esters of methanol with lower fatty acids, i.e. acids containing between 2 and 4 carbon atoms. We may also use the catalysts for the carbonylation of ethanol, propanol and the butanols, as well as the esters derived from these alcohols with lower fatty acids. Instead of alcohols we may also use ethers, containing radicals of lower fatty alcohols, i.e. those containing up to 4 carbon atoms. Mixtures of the alcohols mentioned before with each other or with ethers and/or esters may also be used as starting materials.

The reaction products obtained according to our invention, as a rule, consist primarily of carboxylic acids or their esters, or when starting from ethers or esters and working in the absence of water, carboxylic acid anhydrides.

The following examples will further illustrate how our invention may be carried out in practice. The parts are by weight.

Example 1

A rotating autoclave of stainless steel is charged with a mixture of 200 parts of methanol, 4.5 parts of cobalt acetate, 7 parts of iodine and 6.5 parts of glycocoll after having replaced the air by nitrogen. Carbon monoxide is then pressed in in the cold under a pressure of 100 atmospheres. The autoclave is then heated to 200° C. while rotating, and the pressure is simultaneously increased to 700 atmospheres by pressing in more carbon monoxide. This pressure is maintained by continuously replenishing the carbon monoxide as consumed until any such consumption has ceased. The reaction product has an acid value of 672 which corresponds to an acetic acid content of 72 percent, and a saponification value of 781 which corresponds to a methyl acetate content of 14 percent. After having distilled off the methyl acetate and the acetic acid, the distillation residue can be used as a catalyst for the same reaction.

The following table shows the results of the carbonylation of methanol in a rotating stainless steel autoclave at 200° C. with carbon monoxide for 24 hours under the influence of various polyfunctional complex-forming additives. In each case, 200 parts of methanol, 4.5 parts of cobalt acetate and 7 parts of iodine were used as a charging stock.

| Polyfunctional additive | Amount in parts | Pressure of CO in atms. | Parts | Reaction product | |
|---|---|---|---|---|---|
| | | | | Percent acetic acid | Percent methyl acetate |
| Diethanol amine | 8 | 300 | 334 | 76 | 6 |
| Triethanol amine | 12 | 400 | 312 | 63 | 23 |
| Monoethanolethylamine | 6 | 300 | 320 | 72 | 13 |
| o-Aminophenol | 8 | 700 | 347 | 78 | 13 |
| o-Aminocresol | 9 | 700 | 322 | 75 | 14 |
| p-Aminophenol | 8 | 700 | 325 | 72 | 7 |
| N-β-Hydroxyethyl-iminodipropionic acid | 100 | 300 | 361 | 74 | 9.5 |
| p-Aminosalicylic acid | 8 | 200 | 253 | 65 | 25 |
| Pyrrolidone | 8 | 700 | 350 | 88 | 0 |
| Anthranilic acid | 8 | 500 | 325 | 77 | 13 |
| α-Ketopropionic acid | 10 | 700 | 257 | 74 | 17 |
| α-Ketopropionic acid | 10 | 300 | 356 | 68 | 12 |
| +Pyrrolidone | 6 | | | | |
| Propionyl propionic acid | 10 | 300 | 327 | 72 | 12 |
| Citric acid | 10 | 700 | 358 | 71 | 17 |
| Acetyl acetone | 8 | 300 | 306 | 62 | 29 |
| Hydroquinone | 5 | 300 | 343 | 63 | 15 |
| Ethylene diamine | 5 | 300 | 332 | 65 | 11 |

Example 2

A mixture of 200 parts of methanol, 4.5 parts of cobalt acetate, 7 parts of iodine and 8 parts of m-aminophenol is treated with carbon monoxide at a pressure of 70 atmospheres and a temperature of 200° C. in the manner described in Example 1 and kept under a CO-pressure of 300 atmospheres until carbon monoxide is no longer consumed. The reaction product obtained has an acid value of 730 which corresponds to an acetic acid content of 78 percent, and a saponification value of 820 which corresponds to a methyl acetate content of 12 percent.

Example 3

A mixture of 200 parts of methyl acetate, 60 parts of water, 4.5 parts of cobalt acetate, 6 parts of iodine and 8 parts of m-aminophenol is treated with carbon monoxide at 70 atmospheres, then heated to 200° C. under a carbon monoxide pressure of 300 atmospheres until carbon monoxide is no longer consumed. The reaction product has an acid value of 761 which corresponds to an acetic acid content of 83 percent. There is no methyl acetate in the reaction mixture.

When under otherwise identical conditions 200 parts of methanol, 10 parts of water, 4.5 parts of cobalt acetate, 6 parts of iodine and 5 parts of ethanol amine are caused to react with carbon monoxide, a reaction product is obtained, which has an acid value of 744, corresponding to an acetic acid content of 80 percent, and a saponification value of 785, corresponding to a methyl acetate content of 6 percent. Under otherwise identical conditions the addition of 12 parts of triethanol amine leads to a reaction product with the acid value 740, corresponding to an acetic acid content of 79 percent, and a saponification value of 799, corresponding to a methyl acetate content of 8 percent.

Example 4

A mixture of 200 parts of methanol, 4.5 parts of cobalt acetate, 6 parts of iodine and 8 parts of salicylic acid is treated with carbon monoxide in the manner described in Example 1. The reaction product has an acid value of 640 which corresponds to an acetic acid content of 69 percent, and a saponification value of 765 which corresponds to a methyl acetate content of 16 percent.

When using 10 parts of propionyl propionic acid instead of salicylic acid, the reaction product has an acid value of 711 which corresponds to an acetic acid content of 76 percent, and a saponification value of 782 which corresponds to a methyl acetate content of 8 percent.

With 10 parts of hydroquinone as a catalyst additive the reaction product has an acid value of 627 which corresponds to an acetic acid content of 67 percent, and a saponification value of 760 which corresponds to a methyl acetate content of 17 percent.

Example 5

A mixture of 200 parts of methanol, 4.5 parts of cobalt acetate, 6 parts of iodine, 8 parts of β-keto-propionic acid and 6 parts of pyridine is treated with carbon monoxide in the manner described in Example 2. The reaction product has an acid value of 817 which corresponds to an acetic acid content of 88 percent, and a saponification value of 860 which corresponds to a methyl acetate content of 6 percent.

When working under otherwise identical conditions with 5 parts of cobalt propionate instead of cobalt acetate, the result is substantially the same. The reaction product contains traces of propionic acid.

Example 6

A mixture of 200 parts of methanol, 4.5 parts of cobalt acetate, 6 parts of iodine and 9 parts of adipic acid dinitrile is treated with carbon monoxide at 200° C. and a pressure of 300 atmospheres in the manner described in Example 2. The reaction product has an acid value of 790 which corresponds to an acetic acid content of 85 percent, and a saponification value of 825 which corresponds to a methyl acetate content of 4 percent.

Example 7

200 parts of methyl acetate, 6 parts of iodine, 4.5 parts of cobalt acetate or propionate and 7 parts of succinic acid dinitrile are treated with carbon monoxide at 250° C. and at a pressure of 400 atmospheres in the manner described in Example 2. The reaction product has an acid value of 94 which corresponds to an acetic acid content of 10 percent, an acetic acid anhydride value of 640 which corresponds to a content of acetic acid anhydride of 58 percent, and an ester value of 234 which corresponds to a methyl acetate content of 31 percent.

Example 8

A mixture of 200 parts of ethanol, 10 parts of water, 4.5 parts of cobalt acetate, 6 parts of iodine and 5 parts of ethanol amine is treated with carbon monoxide at 300° C. and a pressure of 300 atmospheres in the manner described in Example 2. The reaction product has an acid value of 542 which corresponds to a propionic acid content of 72 percent, and a saponification value of 550 which corresponds to an ethyl propionate content of 1 percent.

When using 5 parts of cobalt propionate in the catalyst, the acid value of the reaction product is slightly increased.

Example 9

A mixture of 200 parts of n-propanol, 10 parts of water, 4.5 parts of cobalt acetate, 12 parts of hydrogen iodide of 57 percent strength and 5 parts of ethanol amine is treated with carbon monoxide at 300° C. and a pressure of 300 atmospheres in the manner described in Example 2. The reaction product has an acid value of 418 which corresponds to a butyric acid content of 66 percent. The butyric acid is a mixture of about equal amounts of iso- and n-butyric acid.

Example 10

200 parts of n-propanol, 16 parts of iron carbonyl, 5 parts of iron acetate, 6 parts of iodine and 10 parts of m-aminophenol are treated with carbon monoxide under the conditions set forth in Example 2. The reaction product has an acid value of 500 which corresponds to a butyric acid content of 79 percent (mixture of iso- and n-butyric acid). There are only traces of butyric acid propyl ester.

Example 11

A mixture of 200 parts of n-propanol, 4.5 parts of nickel acetate, 6 parts of iodine, 8 parts of α-keto-propionic acid and 6 parts of pyridine is treated with carbon monoxide in the manner described in Example 2. The reaction product has an acid value of 406 which corresponds to a butyric acid content of 64 percent (mixture of iso- and n-butyric acid), and a saponification value of 420 which corresponds to 3 percent of butyric acid propyl ester.

*Example 12*

A mixture of 200 parts of methanol, 4.5 parts of nickel acetate, 6 parts of iodine, 12 parts of tartaric acid and 6 parts of pyridine is treated with carbon monoxide in the manner set forth in Example 2. The reaction product has an acid value of 780 which corresponds to an acetic acid content of 84 percent, and a saponification value of 790 which corresponds to a methyl acetate content of 15 percent.

*Example 13*

A mixture of 200 parts of methanol, 6 parts of iodine, 8 parts of m-aminophenol and 6 parts of iron carbonyl is treated with carbon monoxide in the manner described in Example 2. The reaction product has an acid value of 575 which corresponds to an acetic acid content of 62 percent, and a saponification value of 659 which corresponds to a methyl acetate content of 11 percent.

*Example 14*

A mixture of 200 parts of methanol, 5 parts of cobalt carbonyl, 12 parts of hydrogen iodide of 57 percent strength and 8 parts of m-aminophenol is treated with carbon monoxide in the manner described in Example 2. The reaction product has an acid value of 548 which corresponds to an acetic acid content of 59 percent, and a saponification value of 715 which corresponds to a methyl acetate content of 22 percent.

*Example 15*

A mixture of 200 parts of methanol, 5 parts of cobalt carbonyl, 35 parts of sodium iodide and 8 parts of m-aminophenol is treated with carbon monoxide in the manner described in Example 2. The reaction product has an acid value of 599 which corresponds to an acetic acid content of 64.5 percent, and a saponification value of 706 which corresponds to a methyl acetate value of 14 percent.

*Example 16*

A mixture of 200 parts of methanol, 5 parts of cobalt carbonyl, 12 parts of ethyl iodide and 8 parts of m-aminophenol is treated with carbon monoxide in the manner described in Example 2. The reaction product has an acid value of 243 which corresponds to an acetic acid content of 26 percent, and a saponification value of 670 which corresponds to a methyl acetate content of 56.5 percent.

*Example 17*

A mixture of 200 parts of methanol, 4.5 parts of cobalt acetate, 15 parts of ethyl iodide and 8 parts of m-aminophenol is treated with carbon monoxide in the manner described in Example 2. The reaction product has an acid value of 687 which corresponds to an acetic acid content of 73.5 percent. The methyl acetate has been completely converted into acetic acid.

*Example 18*

A mixture of 200 parts of methanol, 40 parts of water, 4.5 parts of cobalt acetate, 15 parts of sodium iodide and 8 parts of m-aminophenol is treated with carbon monoxide in the manner described in Example 2. The reaction product has an acid value of 703 which corresponds to an acetic acid content of 75.5 percent, and a saponification value of 718 which corresponds to methyl acetate content of 1.5 percent.

*Example 19*

A mixture of 200 parts of methanol, 20 parts of water, 4.5 parts of cobalt acetate, 10 parts of hydrogen iodide of 57 percent strength and 8 parts of adipic acid dinitrile is treated with carbon monoxide in the manner described in Example 2. The reaction product has an acid value of 698 which corresponds to an acetic acid content of 75 percent, and a saponification value of 732 which corresponds to a methyl acetate content of 4.5 percent.

*Example 20*

A mixture of 200 parts of methanol, 30 parts of water, 5 parts of cobalt carbonyl, 7 parts of iodine and 8 parts of m-aminophenol, is treated with carbon monoxide in the manner described in Example 2. The reaction product has an acid value of 704 which corresponds to an acetic acid content of 75.5 percent, and a saponification value of 755 which corresponds to a methyl acetate content of 6.7 percent.

*Example 21*

A mixture of 200 parts of methanol, 40 parts of water, 12 parts of cobaltous iodide and 8 parts of m-aminophenol is treated with carbon monoxide in the manner described in Example 2. The reaction product has an acid value of 557 which corresponds to an acetic acid content of 60 percent. The methyl acetate has been completely converted into acetic acid.

*Example 22*

A mixture of 200 parts of methanol, 40 parts of water, 1.5 parts of cobalt, 10 parts of hydrogen iodide of 57 percent strength and 8.5 parts of m-aminophenol is treated with carbon monoxide in the manner described in Example 2. The reaction product has an acid value of 678 which corresponds to an acetic acid content of 73 percent, and a saponification value of 706 which corresponds to a methyl acetate content of 3.7 percent.

*Example 23*

A mixture of 200 parts of methanol, 30 parts of water, 10 parts of cobalt naphthenate, 25 parts of sodium bromide and 5 parts of ethanolamine is treated with carbon monoxide in the manner described in Example 2. The reaction product has an acid value of 267 which corresponds to an acetic acid content of 28.5 percent, and a saponification value of 498 which corresponds to a methyl acetate content of 30.5 percent.

*Example 24*

A mixture of 200 parts of methanol, 2 parts of cobalt, 25 parts of hydrogen bromide of 45 percent strength and 5 parts of ethanolamine is treated with carbon monoxide in the manner described in Example 2. The reaction product has an acid value of 143 which corresponds to an acetic acid content of 15.5 percent, and a saponification value of 264 which corresponds to a methyl acetate content of 16 percent.

*Example 25*

A mixture of 200 parts of methanol, 20 parts of water, 12 parts of cobalt iodide and 8 parts of adipic acid dinitrile is treated with carbon monoxide in the manner described in Example 1. The reaction product has an acid value of 680 which corresponds to an acetic acid content of 73 percent and a saponification value of 755 which corresponds to a methyl acetate content of 10 percent.

*Example 26*

A mixture of 200 parts of methanol, 30 parts of water, 4.5 parts of cobalt acetate, 10 parts of hydrogen iodide of 57 percent strength, 8 parts of pyroracemic acid and 6 parts of pyridine is treated with carbon monoxide in the manner described in Example 1. The reaction product has an acid value of 610 which corresponds to an acetic acid content of 65 percent, and a saponification value of 695 which corresponds to a methyl acetate content of 11 percent.

Example 27

A mixture of 200 parts of methanol, 30 parts of water, 5 parts of cobalt carbonyl, 7 parts of iodine and 8 parts of m-aminophenol is treated with carbon monoxide in the manner described in Example 1. The reaction product has an acid value of 670 which corresponds to an acetic acid content of 72 percent, and a saponification value of 753 which corresponds to a methyl acetate content of 11 percent.

Example 28

A mixture of 200 parts of methanol, 30 parts of water, 12 parts of cobaltous iodide and 5 parts of ethanolamine is treated with carbon monoxide in the manner described in Example 1. The reaction product has an acid value of 602 which corresponds to an acetic acid content of 65 percent, and a saponification value of 728 which corresponds to a methyl acetate content of 16 percent.

Example 29

A mixture of 200 parts of methanol, 30 parts of water, 10 parts of iron, 25 parts of hydrogen bromide of 45 percent strength and 5 parts of ethanolamine is treated with carbon monoxide in the manner described in Example 1 with the exception that the temperature chosen is 275° C. The reaction product has an acid value of 376 which corresponds to an acetic acid content of 40 percent, and a saponification value of 501 which corresponds to a methyl acetate content of 16.5 percent.

Example 30

A mixture of 200 parts of methanol, 40 parts of water, 6 parts of iron carbonyl, 10 parts of hydrogen iodide of 57 percent strength and 8 parts of m-aminophenol is treated with carbon monoxide in the manner described in Example 2 at a temperature of 250° C. The reaction product has an acid value of 332 which corresponds to an acetic acid content of 35.6 percent, and a saponification value of 514 which corresponds to a methyl acetate content of 23.2 percent.

Example 31

A mixture of 200 parts of methanol, 30 parts of water, 12 parts of nickel iodide and 8 parts of m-aminophenol is treated with carbon monoxide in the manner described in Example 2 at a temperature of 275° C. The reaction product has an acid value of 253 which corresponds to an acetic acid content of 27 percent, and a saponification value of 425 which corresponds to a methyl acetate content of 22.8 percent.

Example 32

A mixture of 200 parts of methanol, 30 parts of water, 5 parts of nickel acetate, 12 parts of hydriodic acid (57 percent strength) and 5 parts of ethanolamine is treated with carbon monoxide in the manner described in Example 2 at a temperature of 300° C. The reaction product has an acid value of 420 which corresponds to an acetic acid content of 45 percent, and a saponification value of 567 which corresponds to a methyl acetate content of 19.5 percent.

Example 33

A mixture of 200 parts of methanol, 30 parts of water, 2 parts of nickel, 25 parts of hydrogen bromide of 45 percent strength and 5 parts of ethanolamine is treated with carbon monoxide in the manner described in Example 2 at a temperature of 275° C. The reaction product has an acid value of 48 which corresponds to an acetic acid content of 5 percent, and a saponification value of 89 which corresponds to a methyl acetate content of 5.5 percent.

Example 34

A mixture of 200 parts of methanol, 30 parts of water, 10 parts of nickel bromide and 5 parts of ethanolamine is treated with carbon monoxide in the manner described in Example 2 at a temperature of 275° C. The reaction product has an acid value of 138 which corresponds to an acetic acid content of 15 percent, and a saponification value of 299 which corresponds to a methyl acetate content of 21 percent.

We claim:

1. A process for the production of organic oxygen compounds which comprises treating with carbon monoxide under pressures exceeding 50 atmospheres and at temperatures between 180° and 300° C. an aliphatic oxygen compound selected from the group consisting of monohydroxy saturated aliphatic alcohols having up to 4 carbon atoms, the ethers of said alcohols and the esters of said alcohols with saturated fatty acids having up to 4 carbon atoms in the presence of a catalyst containing a metal of the iron group, a halogen and a complex forming non-olefinic organic compound, containing at least 2 functional groups selected from the class consisting of hydroxy, carboxylic acid, nitrile, keto and amino groups, capable of entering into complex combination with metals of the iron group.

2. A process as set forth in claim 1, wherein a monohydroxy saturated aliphatic alcohol having up to 4 carbon atoms is used as the starting material.

3. A process as set forth in claim 1, wherein an ether containing radicals of monohydroxy saturated aliphatic alcohols having up to 4 carbon atoms is used as the starting material.

4. A process for the production of acetic acid which comprises treating with carbon monoxide under pressures exceeding 50 atmospheres and at temperatures between 180° and 300° C. methanol in the presence of a catalyst containing a metal of the iron group, a halogen and a complex forming non-olefinic organic compound containing at least 2 functional groups, selected from the class, consisting of hydroxy, carboxylic acid, nitrile, keto and amino groups, capable of entering into complex combination with metals of the iron group.

5. A process as set forth in claim 4, wherein cobalt is the metal of the iron group used in the catalyst.

6. A process as set forth in claim 4, wherein the metal of the iron group is cobalt in the form of cobalt acetate and the halogen is iodine.

7. A process for the production of acetic acid which comprises treating methanol with carbon monoxide under pressures exceeding 50 atmospheres and at from 180° to 300° C. in the presence of a catalyst composed of cobalt acetate, iodine and a non-olefinic carboxylic acid containing in addition to the carboxylic acid group at least one hydroxy group, capable of entering into complex combination with metals of the iron group.

8. A process as set forth in claim 7, wherein an aliphatic saturated hydroxy carboxylic acid is used in the catalyst.

9. A process for the production of acetic acid which comprises treating methanol with carbon monoxide under pressures exceeding 50 atmospheres and at from 180° to 300° C. in the presence of a catalyst composed of cobalt acetate, iodine and a non-olefinic keto carboxylic acid.

10. A process for the prduction of acetic acid which comprises treating methanol with carbon monoxide under pressures exceeding 50 atmospheres and at from 180° to 300° C. in the presence of a catalyst composed of cobalt acetate, iodine and a non-olefinic amino carboxylic acid.

11. A process for the production of acetic acid which comprises treating methanol with carbon monoxide under pressures exceeding 50 atmosphers and at from 180° to 300° C. in the presence of a catalyst composed of cobalt acetate, iodine and a non-olefinic amino compound containing at least one hydroxy group.

12. A process for the production of acetic acid which comprises treating methanol with carbon monoxide under pressures exceeding 50 atmospheres and at from 180° to 300° C. in the presence of a catalyst composed of cobalt acetate, iodine and a non-olefinic aliphatic dinitrile.

13. A process for the production of organic oxygen compounds which comprises treating with carbon monoxide under pressures exceeding 50 atmospheres and at temperatures between 180° and 300° C. an aliphatic oxygen compound selected from the group consisting of monohydroxy saturated aliphatic alcohols having up to 4 carbon atoms, the ethers of said alcohols and the esters of said alcohols with saturated fatty acids having up to 4 carbon atoms in the presence of a catalyst containing a metal of the iron group, a halogen and, as a complex forming compound, pyrrolidone.

References Cited in the file of this patent

UNITED STATES PATENTS

| | | |
|---|---|---|
| 2,593,440 | Hagemeyer | Apr. 22, 1952 |
| 2,805,248 | Friederich et al. | Sept. 3, 1957 |